(12) United States Patent
Kleveland et al.

(10) Patent No.: US 7,134,056 B2
(45) Date of Patent: *Nov. 7, 2006

(54) HIGH-SPEED CHIP-TO-CHIP COMMUNICATION INTERFACE WITH SIGNAL TRACE ROUTING AND PHASE OFFSET DETECTION

(75) Inventors: Bendik Kleveland, Santa Clara, CA (US); Eric Anderson, Palo Alto, CA (US); Gunes Aybay, Los Altos, CA (US); Philip Ferolito, Sunnyvale, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 599 days.
This patent is subject to a terminal disclaimer.

(21) Appl. No.: 10/439,566

(22) Filed: May 16, 2003

(65) Prior Publication Data
US 2004/0003163 A1    Jan. 1, 2004

Related U.S. Application Data

(60) Provisional application No. 60/385,989, filed on Jun. 4, 2002.

(51) Int. Cl.
*G06F 11/00* (2006.01)
*G06F 13/14* (2006.01)

(52) U.S. Cl. .................. 714/704; 714/703; 714/56; 710/305

(58) Field of Classification Search ............... 714/704, 714/48, 51, 56, 703, 705, 707, 731, 819; 710/305
See application file for complete search history.

(56) References Cited

U.S. PATENT DOCUMENTS

| | | | | |
|---|---|---|---|---|
| 5,268,937 | A * | 12/1993 | Marbot | 375/377 |
| 5,625,563 | A * | 4/1997 | Rostoker et al. | 716/2 |
| 5,687,326 | A * | 11/1997 | Robinson | 710/105 |
| 6,522,188 | B1 | 2/2003 | Poole | |
| 6,684,350 | B1 * | 1/2004 | Theodoras et al. | 714/712 |
| 6,845,461 | B1 * | 1/2005 | Kim | 713/500 |
| 2002/0073255 | A1 * | 6/2002 | Davidson et al. | 710/104 |

* cited by examiner

*Primary Examiner*—Albert Decady
*Assistant Examiner*—Fritz Alphonse

(57) ABSTRACT

A high-speed parallel interface for communicating data between integrated circuits is disclosed. In one embodiment, the transmitter controller accepts 40-bit wide data every 167 Mhz clock cycle, the receiver controller delivers 40-bit wide data every 167 Mhz clock cycle, and the interconnect bus transmits 10-bit wide data at every transition of a 333 Mhz clock cycle. In another embodiment, the transmitter controller accepts 32-bit wide data every 167 Mhz clock cycle, the receiver controller delivers 32-bit wide data every 167 Mhz clock cycle, and the interconnect bus of this embodiment transmits 8-bit wide data at every transition of a 333 Mhz clock cycle. Output pins of the transmitter interface can be connected to any input pins of the receiver interface. Furthermore, the high-speed parallel interface does not require a fixed phase relationship between the receiver's internal clock(s) and the bus clock signal.

28 Claims, 11 Drawing Sheets

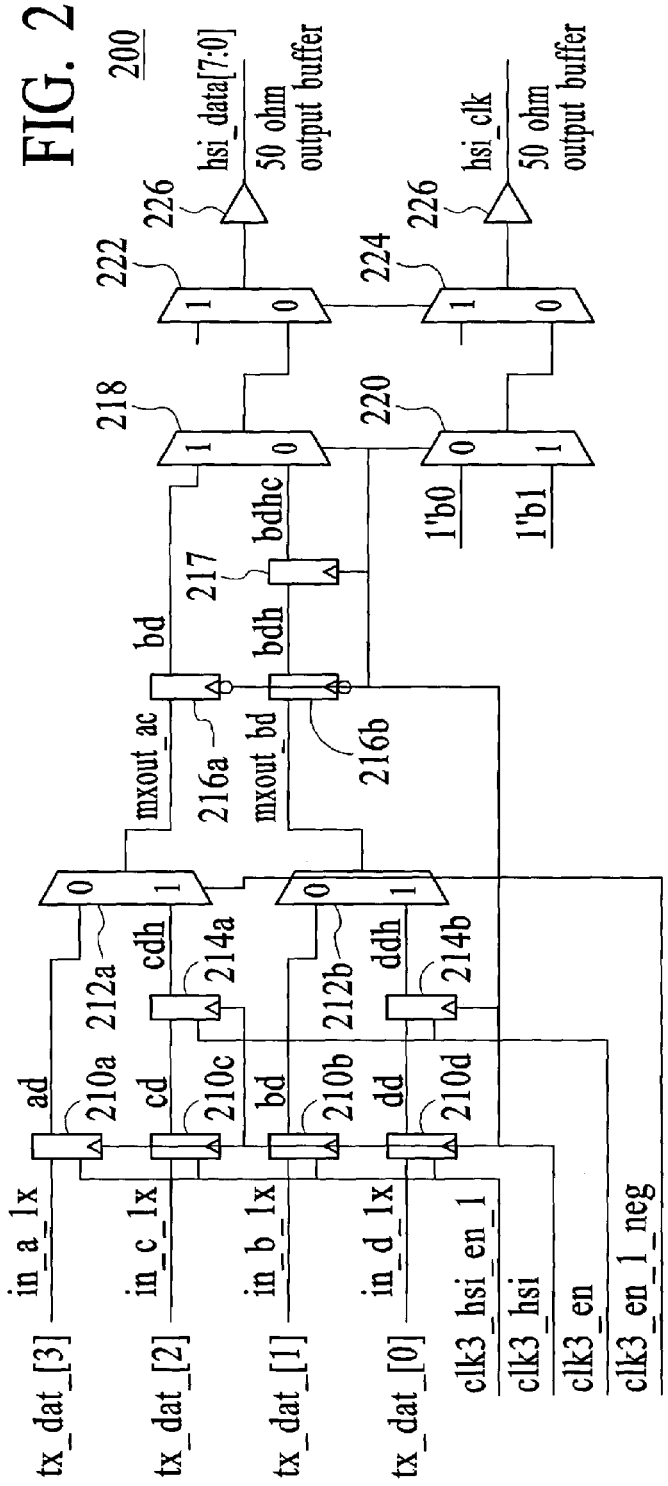
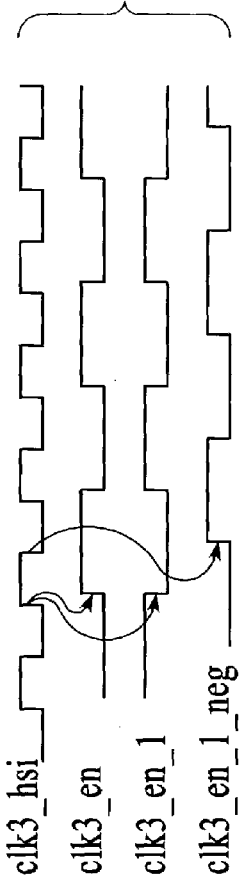

bit0 0100101000110100110101110100110010101101010100001100110101000...
bit1 1100001111111001010010011001100110001001011010110110111011010...
bit2 1111011100010101000100100010000011000000100110101101101110010...
bit3 1101010011000100010001001000001010101001001011111100011101010...
bit4 1011110101011100011110101010100100100100010010100010101101100...
bit5 1111110011001100110000010100101111100010010110111101101011101...
bit6 1100011010101000100100000110000010101010101010011010011001110...
bit7 0000011101001101100001110000100001010100010111011100011101101...
bit8 0110111110001100110101101110100010111001010010110010100000101...
bit9 0100101011001100011010101000101011111010100001111011110000101...

HIGH-SPEED CHIP-TO-CHIP COMMUNICATION INTERFACE WITH SIGNAL TRACE ROUTING AND PHASE OFFSET DETECTION

CROSS-REFERENCE TO RELATED APPLICATION

This application is entitled to the benefit of provisional Patent Application Ser. No. 60/385,989, filed Jun. 4, 2002, and is related to co-pending non-provisional patent application entitled "HIGH-SPEED CHIP-TO-CHIP COMMUNICATION INTERFACE", Ser. No. 10/439,571, filed May 16, 2003, both of which are hereby incorporated by reference.

FIELD OF THE INVENTION

The invention relates generally to a high-speed chip-to-chip communication interface.

BACKGROUND OF THE INVENTION

A few years ago, a small number of people accessed primarily text-based information through the Internet. Today, motion video and sound combined with a huge increase in users have pushed the internet infrastructure and the performance of communications equipment to the limit. The explosive demands from the Internet are driving the need for higher speed integrated circuits. As the speed of integrated circuits increases, higher bandwidth buses interconnecting the integrated circuits are needed.

The traditional ways to increase the bandwidth of a bus are to increase bus width and bus clock frequency. Increasing bus width is effective to a point. But eventually, this solution runs into the problem of requiring too many pins. Pins add cost: pins take board area, increase package costs and size, increase test costs and affect electrical performance. Increasing bus width also makes length-matching signal traces, which is required in many high performance systems, more difficult.

Increasing bus clock frequency is effective but only to a point beyond which it becomes challenging to support reliable data transfer using standard printed circuit board (PCB) technology and standard manufacturing processes. For instance, high frequency clock chips are expensive and difficult to build, and there is more electrical loss on the boards interconnecting the chips. Other electromagnetic problems such as cross-talk are more likely to materially affect signal transmission at very high frequency.

In some electronics systems, differential signaling technologies (e.g., differential LVDS) are used to communicate data between integrated circuits. Differential signaling technologies typically require complex circuitry that consumes large die areas and large amounts of power. For example, an implementation of a differential LVDS link can require $6.2 \times 10^6$ $\mu m^2$ of die area and consume more than 1.7 Watts of power. Furthermore, differential signaling technologies are difficult to implement because they often require one or more Phase-Locked Loops (PLL) or Delay-Locked Loops (DLL) as well as some additional complex analog circuits. In addition, differential signaling technologies require careful isolation because they tend to be sensitive to core switching noise.

Accordingly, what is needed is a high speed interconnect between integrated circuits that does not require a high pin count, large die areas and large amounts of power. What is further needed is a high speed interconnect that can be implemented using standard PCB technology and standard manufacturing processes.

SUMMARY OF THE INVENTION

An embodiment of the invention is a high-speed parallel interface for communicating data between integrated circuits. In this embodiment, the interface is implemented by a transmitter and receiver pair coupled to a single-ended parallel interconnect bus on which data is transmitted at full-swing.

In one embodiment, the transmitter includes a transmitter controller and a transmitter interface circuit. Likewise, the receiver includes a receiver controller and a receiver interface circuit. Logic circuits feed data to the transmitter controller synchronously with an internal clock. The transmitter interface circuit, controlled by the transmitter controller, interleaves the data and provides the interleaved data to the interconnect bus synchronously with transitions of a bus clock. The receiver interface circuit, controlled by the receiver controller, captures data from the interconnect bus, de-interleaves the captured data, and resynchronizes the data to an internal clock of the receiver. To the logic feeding, the transmitter and logic getting data from the receiver, the interconnect of the present embodiment appears to be simple digital pipeline where latency is dependent on the length of the signal traces connecting the transmitter and the receiver.

In one embodiment, the transmitter accepts a 32-bit data word every clock cycle, interleaves this data and outputs the interleaved data to a single-ended 8-bit data bus along with a bus clock running at twice the frequency of the transmitter's internal clock. In this embodiment, the receiver captures the arriving data with the provided bus clock (one 8-bit data word on every edge of the provided bus clock) and uses a FIFO (First-In-First-Out buffer) to resynchronize the captured data with the receiver's internal clock. The receiver then transfers the resynchronized 32-bit data out to logic circuits interfacing to the receiver.

In another embodiment of the invention, the transmitter accepts a 40-bit data word every clock cycle, interleaves this data and outputs the interleaved data to a single-ended 10-bit data bus along with a bus clock running at twice the frequency of the transmitter's internal clock. The receiver captures 10-bit data from the 10-bit data bus with the provided bus clock, de-interleaves the data, resynchronizes the data and outputs 40-bit data to logic circuits interfacing to the receiver.

In one embodiment, the bus clock signal has a frequency of approximately 333 Mhz. The internal clock signals of the transmitter and the receiver have a frequency of approximately 167 Mhz and are preferably generated off the same frequency source.

Data latency is dependent on the length of the signal traces of the interconnect bus. In one embodiment where the maximum length of the signal traces is 30 inches, the minimum latency is seven 167 Mhz clock cycles and the maximum latency is eight 167 Mhz clock cycles.

According to one embodiment of the invention, output pins of the transmitter interface can be connected to any input pins of the receiver interface. In other words, the receiver can reconstruct transmitted data regardless of a bit-lane correspondence of the parallel interconnect bus. In one embodiment, when the interconnect is reset, the transmitter generates and transmits a learning pattern to the receiver. The receiver, having stored therein patterns it expects to receive, then compares the incoming data with the local patterns to determine the bit-lane correspondence of the signal traces. When the bit-lane correspondence is determined, the receiver will be able to reconstruct the transmitted data accordingly.

In one embodiment, the receiver controller includes circuits configured to detect "signatures" in the received data and circuits configured to identify a particular bit-lane correspondence that is associated with the detected signature.

According to one embodiment, the high-speed parallel interface does not require a fixed phase relationship between the receiver's internal clock(s) and the bus clock signal. A bit transmitted on the rising edge of the bus clock can be mapped to bits received on the rising edge or falling edge of the receiver's internal clock. To determine this phase relationship (or phase offset), when the interconnect is reset, the transmitter sends a predetermined learning pattern to the receiver. The receiver, having stored therein patterns it expects to receive, then compares the incoming data with the local patterns to determine the phase relationship. When the phase relationship is determined, the receiver will be able to reconstruct the data accordingly.

In one embodiment, the receiver controller includes circuits configured to detect "signatures" in the received data and circuits to identify the correct phase relationship or phase offset between the bus clock and the receiver's internal clock that is associated with the detected signature.

According to yet another embodiment of the invention, the receiver can detect and report the transmission error rate of the interconnect bus. This is enabled by pseudo-random data sequence generators in both the transmitter controller and the receiver controller. The pseudo-random data sequence generator of the transmitter generates a predetermined pseudo-random sequence of data, which is fed to the transmitter interface circuit and transmitted to the receiver via the interconnect bus. The receiver controller, which includes a generator that can generate the same pseudo-random data sequence, compares the incoming data against the locally generated sequence to determine a transmission error rate. If the transmission error rate is above a predetermined threshold, the receiver controller will generate an error message.

Other aspects and advantages of the invention will become apparent from the following detailed description, taken in conjunction with the accompanying drawings, illustrating by way of example the principles of the invention.

BRIEF DESCRIPTION OF THE DRAWINGS

FIG. 2 is a block diagram illustrating part of the HSI Tx Interface Circuit of FIG. 1, in accordance with one embodiment of the invention.

FIG. 3 is a timing diagram showing the clock signals of the circuit of FIG. 2, in accordance with one embodiment of the invention.

FIG. 14 illustrates part of a sample CRC test pattern generated by the HSI Tx Controller of FIG. 1, in accordance with one embodiment of the invention.

DETAILED DESCRIPTION OF THE INVENTION

Figure 1:
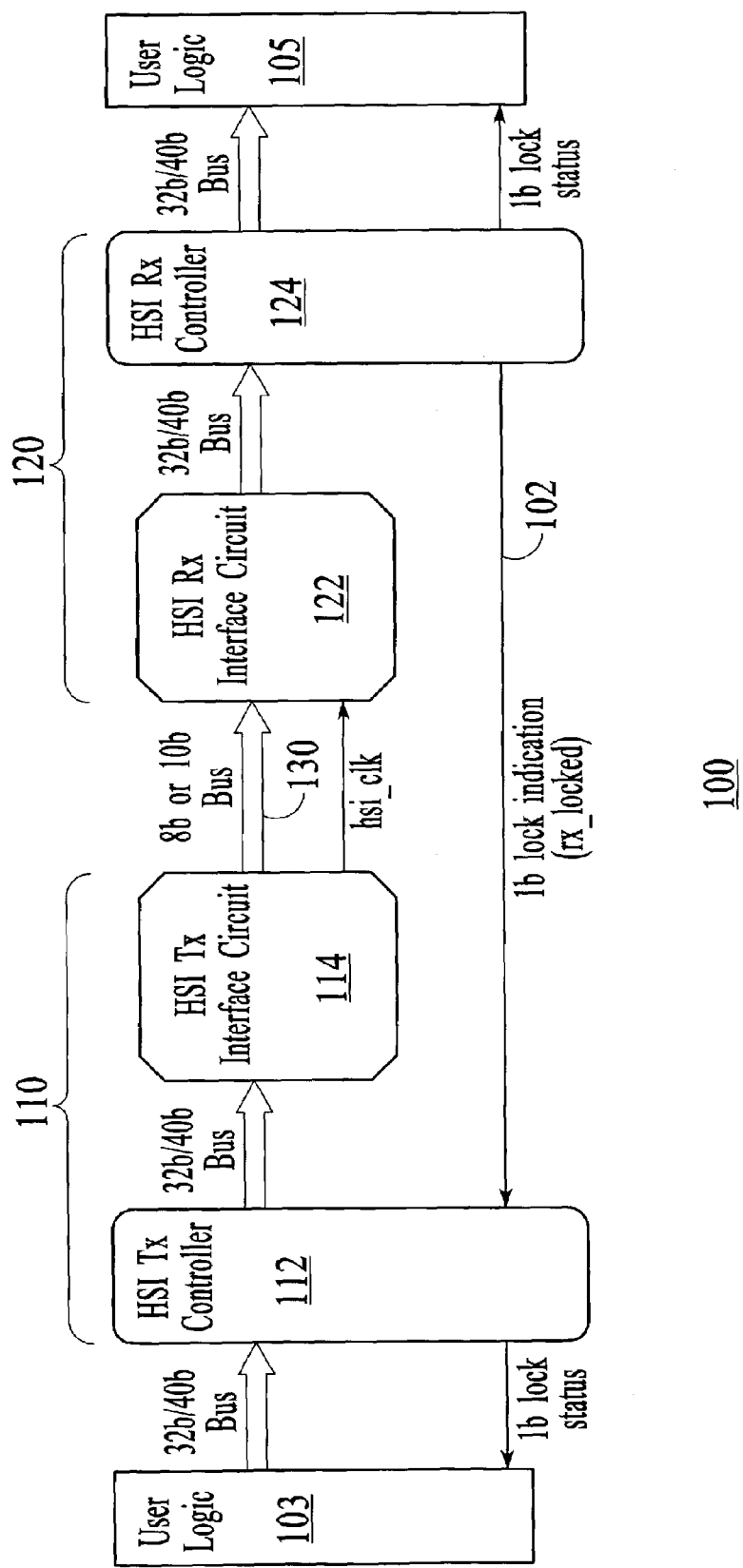
FIG. 1 is a block diagram illustrating a block diagram of a High-Speed Interconnect (HSI) link for communicating data between chips in accordance with one embodiment of the invention.

FIG. 1 is a block diagram illustrating a High-Speed Interconnect (HSI) link 100 for communicating data between chips in accordance with one embodiment of the invention. The HSI link 100 includes a transmitter 110 and a receiver 120 connected by an interconnect bus 130. In one embodiment, the transmitter 110 and the receiver 120 are implemented within separate chips (not shown) but within a same backplane of a high-speed electronic communication system. As shown, the transmitter 110 includes a HSI Tx Controller 112 and a HSI Tx Interface Circuit 114. The receiver 120 Includes a HSI Rx Interface Circuit 122 and a HSI Rx Controller 124. The HSI Tx Interface Circuit 114 and the HSI RX Interface Circuit 122 are preferably implemented as hard macro cells (or "hardmacs"), and the HSI Tx Controller 112 and the HSI Rx Controller 124 are preferably synthesizable. Also shown in FIG. 1 are user logic 103 that feeds data to the HSI Tx Controller 112 and user logic 105 that receives data from the HSI Rx Controller 124.

In the embodiment illustrated in FIG. 1, the HSI link 100 is operable in "set up" mode and a "normal mode." In "normal" mode, logic circuits feed a 40-bit wide data stream that is synchronous with an internal clock of the transmitter 110 to the HSI Tx Controller 112. The controller 112 then passes the data to the HSI Tx Interface Circuit 114. The HSI Tx Interface Circuit 114, controlled by the HSI Tx Controller 112, interleaves the 40-bit wide data stream into a 10-bit wide data stream and provides the 10-bit wide data stream to the interconnect bus 130 at every transition of a bus clock hsi_clk. The HSI Rx Interface Circuit 122, controlled by the HSI Rx Controller 124, captures the 10-bit wide data stream from the interconnect bus 130, de-interleaves the captured data into a 40-bit wide data stream, and resynchronizes the data to an internal clock of the receiver 120. The de-interleaved and resynchronized data is then passed to the HSI Rx Controller 124 and subsequently to user logic 105. To the user logic 103 and 105, the HSI link 100 appears to be a simple digital pipeline.

In the "set up" mode, operations of the transmitter 110 and the receiver 120 are similar to those in the "normal" mode.

However, the 40-bit wide data stream is generated by the HSI Tx Controller 112. In particular, the HSI Tx Controller 112 generates special patterns for initialization purposes such as "bit-lane mapping" and/or clock phase relationship determination. The HSI Rx Controller 124 does not pass received data to the user logic 105. Rather, the HSI Rx Controller 124 scans for "signatures" in the received data and identifies a particular "bit-lane" correspondence and/or clock phase relationship associated with the detected signature. Operations of the "set up" mode will be described in greater detail below.

With reference still to in FIG. 1, the bus clock hsi_clk runs at approximately 333 Mhz, and the internal clocks of the transmitter 110 and receiver 120 run at approximately 167 Mhz. The bus clock hsi_clk is preferably generated by the transmitter 110. The transmitter 110 and the receiver 120 both preferably operate off the same frequency source to generate the 167 Mhz clocks. Furthermore, in this embodiment, the HSI link 100 transfers 10-bit data on every transition of the 333 Mhz bus clock. As the result the data rate of the HSI link 100 is approximately 6.6 Gb/s.

In another embodiment, the transmitter 110 generates or accepts a 32-bit wide data stream synchronously with the transmitter 110's internal clock. The interconnect bus 130 communicates a 8-bit wide data stream synchronously with transitions of the bus clock hsi_clk. And, the receiver 120 delivers a 32-bit wide data stream to user logic 105 synchronously with an internal clock of the receiver 120.

In accordance with the invention, the HSI link 100 communicates non-differential signals over single-ended signal traces of the interconnect bus 130. As used herein, a differential signal is carried on two conductors, and the signal value is the difference between the individual voltages on each conductor. A non-differential signal, on the other hand, is carried on one conductor, and the signal value is the difference between the voltage on the conductor and a ground voltage. Furthermore, in one embodiment, data signals are transmitted across the interconnect bus 130 at full-swing. As used herein, a "full swing" signal swings approximately between a supply voltage (Vdd or Vddq) and zero volts (ground), and "small swing" signals have small amplitudes relative to the supply voltage levels. For example, for CMOS circuits wherein the supply voltage Vdd is equal to 1.8 volts and system ground VSS is equal to zero volts, a "full swing" signal swings approximately between 1.8 volts and zero volts. A "small swing" signal may have an amplitude of 0.2 volts that swings between a low of 0.8 volt and a high of 1.0 volt.

With reference again to the embodiment illustrated in FIG. 1, data latency is dependent on the length of the signal traces of the interconnect bus 130. In one embodiment where the bus clock runs at approximately 333 Mhz and where the maximum length of the signal traces is 30 inches, the minimum latency is seven 167 Mhz clock cycles and the maximum latency is eight 167 Mhz clock cycles.

FIG. 2 is a block diagram illustrating part of a circuit 200 within the HSI Tx Interface Circuit 114. In this embodiment of the invention, the circuit 200 uses four control/clock signals: clk3_hsi, clk3_en, clk3_en_1, and clk3_en_1_neg, as illustrated in FIG. 3. In one embodiment, the signal clk3_hsi is a 333 Mhz clock signal. The signals clk3_en, clk3_en_1 and clk3_en_1_neg are 167 Mhz clock signals. Preferably, the signals clk3_en, clk3_en_1 and clk3_en_1_neg are generated off clk3_hsi.

The circuit 200 has four inputs (in_a_1x, in_b_1x, in_c_1x, in_d_1x) coupled to the HSI Tx Controller 112 for receiving four data streams: tx_data[0], tx_data[1], tx_data[2] and tx_data[3]. The data streams tx_data[3], tx_data[1], tx_data[2] and tx_data[0] are synchronous with an internal clock of the HSI Tx Controller 112, which has half the frequency of clk3_hsi. Data latches 210a–210d, which are synchronous with clk3_hsi, receive the data streams and output them to multiplexers ("muxes") 212a–212b directly or through data latches 214a–214b. Specifically, the outputs of data latches 210a and 210b are connected to one input of muxes 212a–212b, and the outputs of data latches 210c and 210d are connected to the muxes 212a–212b through data latches 214a–214b. Thus, data from data latches 210c–210d reaches muxes 212a–212b one clock cycle after data from data latches 210a–210b.

The muxes 212a–212b are controlled by clk_en_1_neg. When clk_en_1_neg is at logic "0", outputs from data latches 210a–210b are selected. When clk_en_1_neg is at logic "1", outputs from the data latches 210c–210d are selected. As shown in FIG. 3, clk_en_1_neg has a cycle that is twice as long as that of clk3_hsi. During one half the clk_en_1_neg cycle, muxes 212a–212b will output bits from tx_data[3] and tx_data[1], respectively. During the other half of the clk_en_1_neg cycle, muxes 212a–212b will output bits from tx_data[2] and tx_data[0], respectively.

Outputs of the muxes 212a–212b are connected to data latches 216a–216b, which are synchronous to falling transitions of clk3_hsi. Output of the data latch 216a is connected directly to the mux 218. Output of the data latch 216b is connected to the mux 218 through another data latch 217, which is synchronous to clk3_hsi. The mux 218 itself is synchronous with clk3_hsi. When the clk3_hsi signal is at logic "1", the mux 218 selects the output of data latch 216a to be output. When the clk3_hsi signal is at logic "0", the mux 218 selects the output data latch 216b to be output. The result is that, over two clk3_hsi cycles, the mux 218 outputs bits from tx_data[3], tx_data[1], tx_data[2] and tx_data[0]. In other words, the HSI Tx Interface Circuit 114 interleaves data streams tx_data[3], tx_data[1], tx_data[2] and tx_data[0] into one resultant data stream. Furthermore, the resultant data stream has four times the data rate of those of the input data streams.

For manufacturing purposes, the HSI Tx Interface Circuit 114 preferably implements IEEE compliant boundary scan. Hence, the output of mux 218 is connected to an input of an optional BSCAN mux 222 for debugging purposes. The output of BSCAN mux 222 is connected to a CMOS output buffer 226. Under normal operations, mux 222 will select the output of mux 218.

The signal clk3_hsi also controls mux 220, which selects a logic "0" or a logic "1" according to the clk3_hsi signal to generate the bus clock signal hsi_clk. The output of the mux 220 is also coupled to another optional BSCAN mux 224. The output of the BSCAN mux 224 is connected to another CMOS output buffer 226. Under normal operations, mux 224 will select the output of mux 220.

In the embodiment illustrated in FIG. 2, the CMOS output buffers 226 have an impedance of 50 Ohms, matching the impedance of signal traces on commonly available printed circuit boards.

It should be noted that the circuit in FIG. 2 is configured to receive four data streams and to interleave them for output on one signal trace of the interconnect bus 130. In one embodiment where the user logic 103 feeds a 40-bit wide data stream to the HSI Tx Interface Circuit 114, ten circuits similar to circuit 200 are implemented in the transmitter 110. Also, in this embodiment, the interconnect bus 130 has eleven signal traces, ten of which are used for communicating data and one of which is used for communicating the clock signal hsi_clk.

Preferably, clk3_hsi should maintain a clean 50:50 duty cycle and should be routed in a way to minimize jitter due to other signals and on chip noise. Duty cycle is important in this embodiment because data at the receiver 120 is captured using both rising and falling edges of the clock hsi_clk. Any degradation of the clk3_hsi signal will translate into less setup/hold time for data with respect to these capture edges. In one embodiment, the clk3_hsi clock signal is generated by a Phase-Locked Loop (PLL) circuit (not shown).

Figure 4:
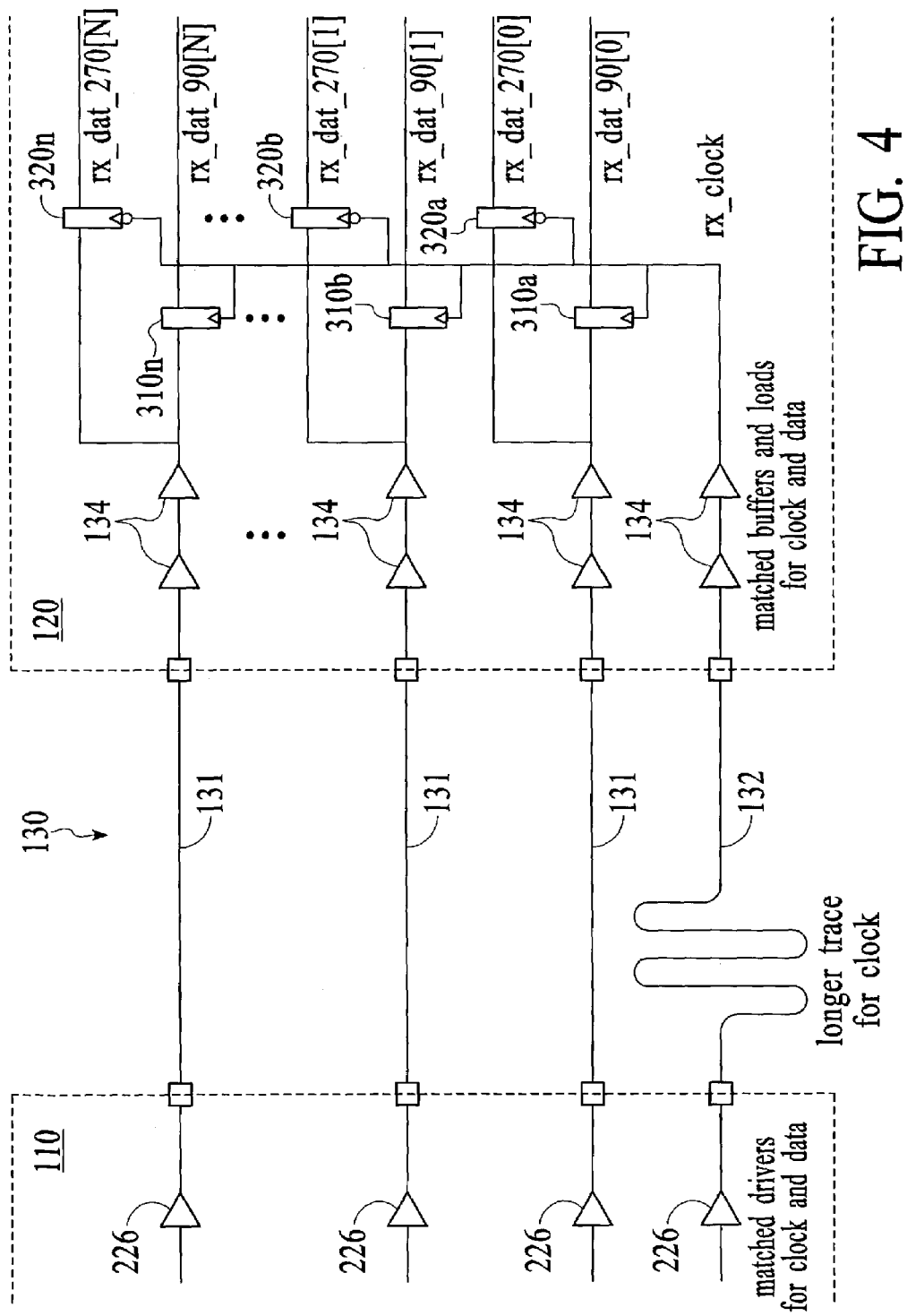
FIG. 4 is a block diagram illustrating connections among outputs of the transmitter, the interconnect bus, and the receiver according to one embodiment of the invention.

FIG. 4 is a block diagram illustrating connections among the CMOS output buffers 226 of the transmitter 110, the signal traces 131 and 132 of the interconnect bus 130, and input buffers 134 of the receiver 120. Capture flops 310*a*–310*n* and 320*a*–320*n* of the receiver 120 are also shown in FIG. 4. In one embodiment, the input buffers 134 are 1.8V CMOS buffers. The input buffers 134 do not have an explicitly controlled input reference voltage. Thus, their switching threshold can be sensitive to the on-chip digital noise inherent in any very large scale designs. To reduce this sensitivity, the input buffers 134 use isolated power.

The bus clock signal hsi_clk, which is used by the capture flops 310*a*–310*n* and 320*a*–320*n* for capturing data, is carried by the signal trace 132. Note that the clock trace 132 is longer than data traces 131 such that the bus clock signal hsi_clk is artificially delayed to produce a clock signal rx_clock. In one embodiment, rx_clock and the data are offset by at least the hold time of the capture flops 310*a*–310*n* and 320*a*–320*n*. The optimal trace length difference is dependent on the PCB materials and the characteristics (e.g., hold time) of the capture flops. In another embodiment, a DLL (Delay Locked-Loop) circuit can be used to ensure an offset between the clock and the data.

With reference still to FIG. 4, the rx_clock signal is used by capture flops 310*n*–310*n* and 320*n*–320*n* to capture incoming data. In particular, capture flops 310*a*–310*n* capture data that is synchronous with rising transitions of the rx_clock signal, and capture flops 320*a*–320*n* capture data that is synchronous with falling transitions of rx_clock.

In the present embodiment, incoming data has no fixed phase relationship with the receiver 120's internal clock(s). A bit transmitted on the rising edge of the bus clock hsi_can arrive on the rising edge or on a falling edge of the receiver's internal clock. In the present embodiment, whether an incoming bit arrives on a rising edge or on a falling edge of the receiver's internal clock is significant because the receiver de-interleaves the incoming data according to when the data is received with respect to the receiver's internal clock. Thus, the HSI Rx Interface Circuit 122 includes circuitry to determine the phase relationship between the data and the receiver 120's internal clock(s) such that the originally transmitted data can be accurately reassembled.

To determine the phase relationship (or phase offset) between rx_clock and an internal clock of the receiver 120, when the HSI link 100 is reset, the transmitter 110 sends a predetermined pattern to the receiver 120. The receiver 120 then compares the incoming data with patterns it expects to receive. A match will reveal the phase relationship. As an example, suppose a data stream "001100110011 . . . " is transmitted. The HSI Rx Interface Circuit 122 will receive either "001100110011 . . . " if the first bit arrives at a rising edge of the receiver 120's internal clock or "110011001100 . . . " if the first bit arrives at a falling edge of the receiver 120's internal clock. The two different received patterns will cause the HSI Rx Interface Circuit 122 to generate distinguishable outputs, which can be used by the HSI Rx Controller 124 to determine the phase relationship between the data and the receiver 120's internal clock domain. According to one embodiment of the invention, the data stream used to determine phase relationship is generated by the HSI Tx Controller 112.

Furthermore, because there is no fixed phase relationship between the data and the receiver 120's internal clock, the HSI Rx Interface Circuit 122 includes FIFO (First-In-First-Out) buffers to re-time the captured data to the receiver 120's internal clock domain.

Figure 5:
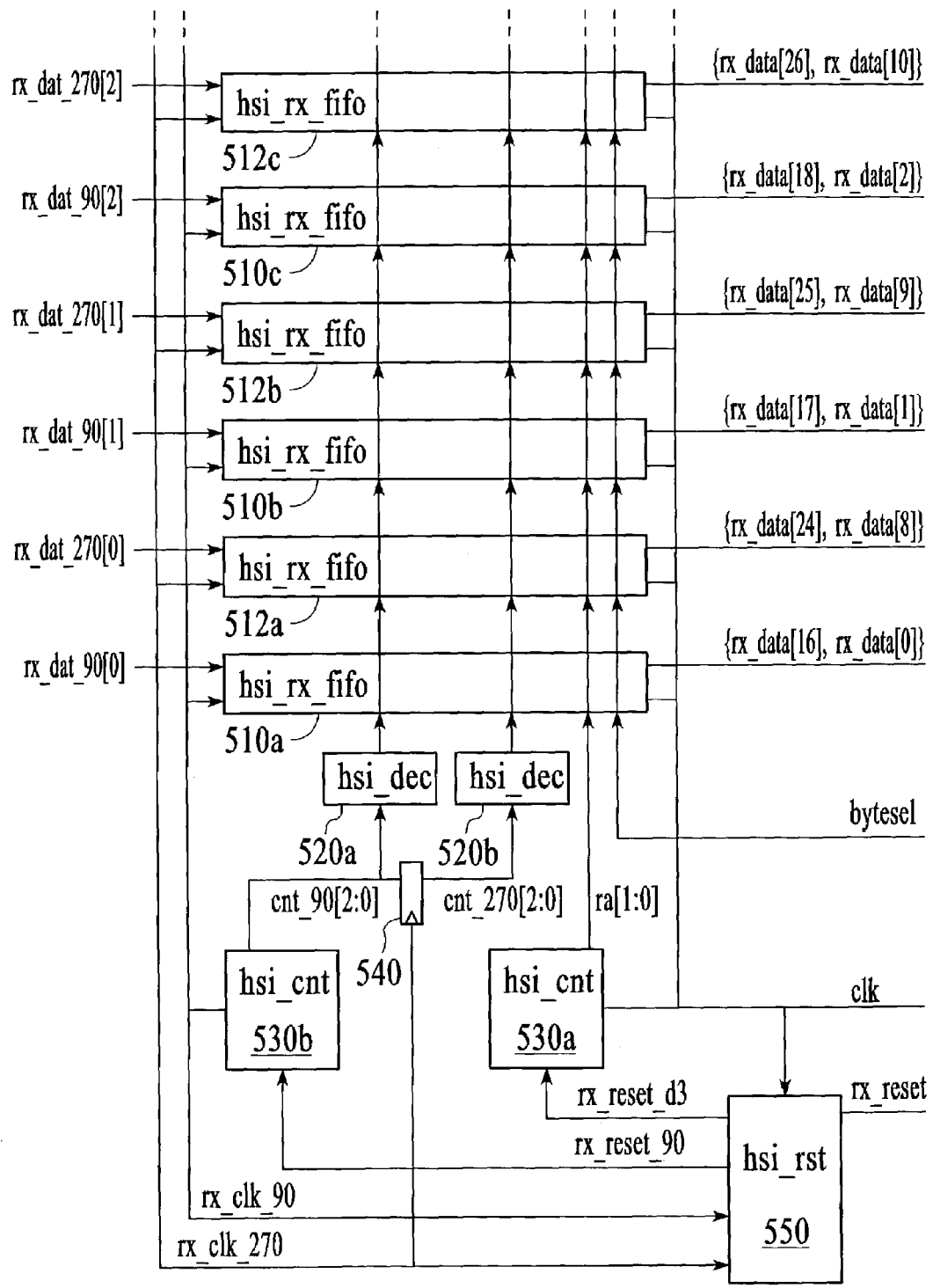
FIG. 5 is a block diagram illustrating a portion of the HSI Rx Interface Circuit of FIG. 1, in accordance with one embodiment of the invention.

FIG. 5 is a block diagram illustrating a portion of the HSI Rx Interface Circuit 124. As shown, the HSI Rx Interface Circuit 124 includes a plurality of FIFO buffers 510*a*–510*d* and 512*a*–512*d*. The FIFO buffers 510*a*–510*d* are coupled to receive data from data latches 310 (FIG. 4), and the FIFO buffers 512*a*–512*d* are coupled to receive data from data latches 320 (FIG. 4). Recall the data latches 310 are synchronous with rising transitions of rx_clock, and the data latches 320 are synchronous with falling transitions of rx_clock. Accordingly, the FIFO buffers 510*a*–510*d* receive a clock signal rx_clock_90, which is the same as rx_clock, and the FIFO buffers 512*a*–512*d* receive a clock signal rx_clock_270 that is 180° out of phase with rx_clock_90. The FIFO buffers 510*a*–510*d* are coupled to a hsi_dec decoder 520*a*, and the FIFO buffers 512*a*–512*d* are coupled to a hsi_dec decoder 520*b*. Further, the FIFO buffers 510*a*–510*d* and 512*a*–512*d* are coupled to a hsi_cnt counter 530*a* to receive a "ra[1:0]" signal. The FIFO buffers 510*a*–510*d* and 512*a*–512*d* output rx_data[n], where n corresponds to the number of bits of the tx_data[n] received by the HSI Tx Interface circuit 114. In FIG. 5, FIFO buffers 510*a*–510*d* and 512*a*–512*d* each output two bits of rx_data[n]. For instance, FIFO buffer 510*a* outputs two bits rx_data[16] and rx_data[0] on two separate output lines, and FIFO buffer 512*a* outputs two bits rx_data[24] and rx_data[8].

The FIFO butters 510*a*–510*d* and 512*a*–512*d* receive a bytesel control signal from the HSI Rx Controller 124 and de-interleave the buffered data accordingly. For instance, the bytesel control signal dictates whether the FIFO buffer 510*a* outputs a bit as rx_data[16] or as rx_data[0]. In the present embodiment, the bytesel control signal is generated by the HSI Rx Controller 124.

Figure 6:
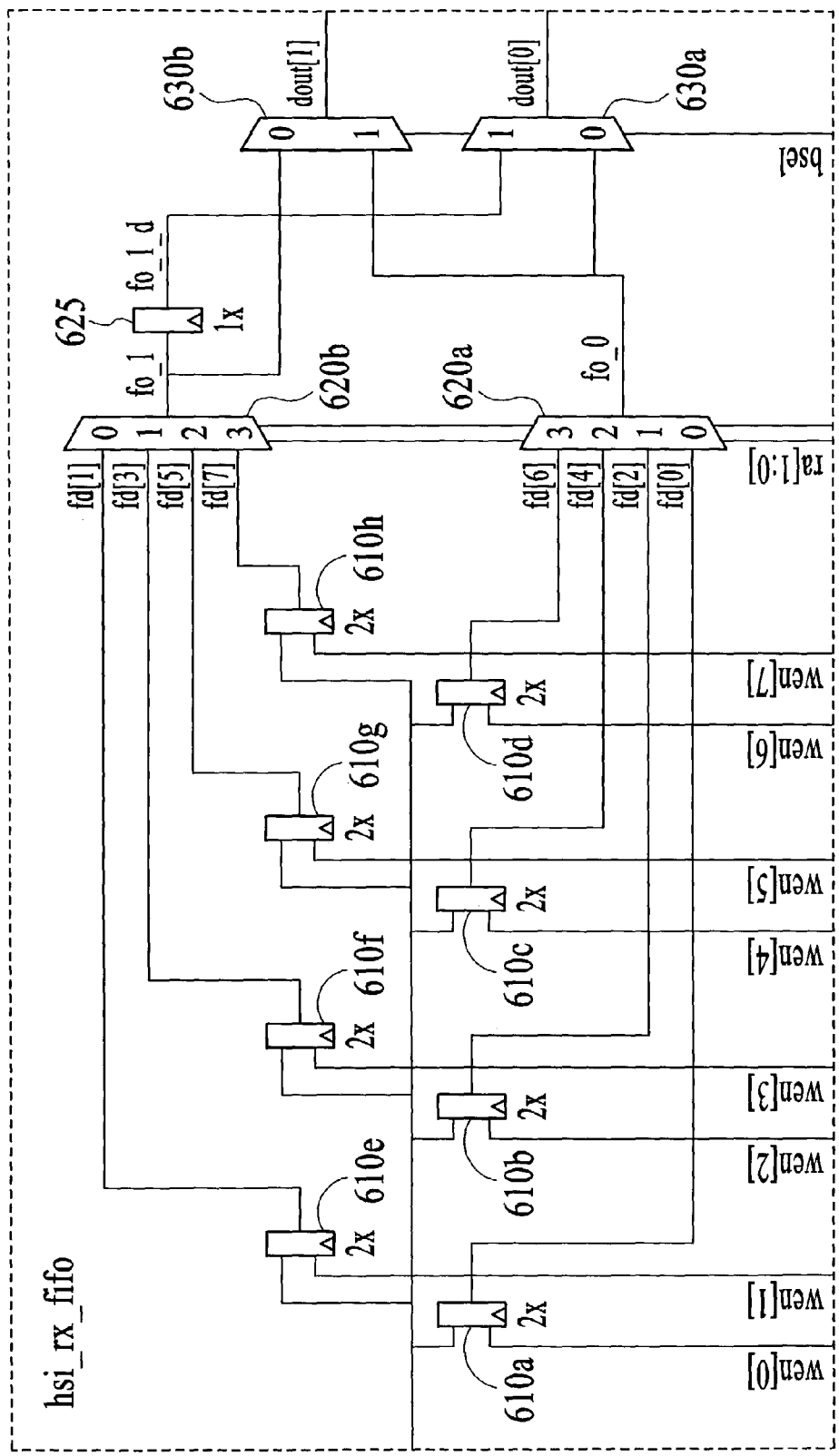
FIG. 6 is a block diagram illustrating another portion of the HSI Rx Interface Circuit of FIG. 1, in accordance with one embodiment of the invention.

Referring now to FIG. 6, there is shown a block diagram of FIFO buffer 510*a*. In one embodiment, all FIFO buffers of the HSI Rx Interface Circuit 122 are similarly implemented. As shown in FIG. 6, the FIFO buffer 510*a* includes eight data latches 610*a*–610*h*, two 4-input muxes 620*a*–620*b*, data latch 625, and two output muxes 630*a*–630*b*. Inputs of the data latches 610*a*–610*h* are coupled to the same output of one of the data latch 310*a*. The data latches 610*a*–610*h* receive a clock signal "2×", which has twice the frequency of an internal clock signal of the receiver 120. In one embodiment, the internal clock signal has a frequency of approximately 167 Mhz and is generated off the same source as an internal clock signal of the transmitter 110. The clock signal "2×" is preferably generated off the 167 Mhz signal and has a frequency of approximately 333 Mhz. Recall data latch 310*a* is synchronous to rx_clock. Thus, in one embodiment where rx_clock is approximately 333 Mhz, the data is entering the FIFO buffer 510*a* at a rate of approximately 333 Mhz.

The data latches 610*a*–610*h* are enabled by control signals wen[7:0]. Particularly, data latches 610*a*–610*d* are write-enabled by wen[0], wen[2], wen[4] and wen[6], whereas data latches 610*e*–610*h* are write-enabled by wen

[1], wen[3] wen[5] and wen[7]. In one embodiment of the invention, the data latches 610a–610h are write-enabled one at a time every 2× clock cycle. Thus, at each 2× clock cycle, data is latched into one of the data latches 610a–610h. Further, each of the data latches 610a–601h keeps stored data for a total of eight 2× clock cycles.

The outputs of the data latches 610a–610h are provided to the 4-input muxes 620a–620b, which are controlled by a signal ra[1:0]. The signal ra[1:0] selects one input of each of the muxes 620a–620b to be output. For instance, when the signal ra[1:0] is 00, the outputs of data latches 610a and 610e will be selected by the muxes 620a–620b. The signal ra[1:0] can be seen as an "output pointer" of the FIFO buffer 510a. In one embodiment, the "output pointer" selects the data latches one 2× clock cycle after they are write-enabled. In other embodiments, the "output pointer" selects the data latches two to six 2× clock cycles after they are write-enabled.

With reference still to FIG. 6, outputs from the data latches 610a–610d are connected to a "0" input of the mux 630a and to the "1" input of the 630b. Outputs from the data latches 610e–610h are connected to the data latch 625, whose output is connected to the "1" input of the mux 630a and the "0" input of the mux 630b. The data latch 625 is synchronous with a "1×" clock. In the present embodiment, the "1×" clock is an internal clock of the receiver 120 and has a frequency of approximately 167 Mhz. The "2×" clock is also an internal clock of the receiver 120 and has a frequency of approximately 333 Mhz.

The muxes 630a–630b are controlled by a select signal bytesel, which is generated by the HSI Rx Controller 124. In this embodiment, the bytesel signal controls whether data stored in data latches 610a–610d is mapped to output dout[0] or dout[1]. In this way, the HSI Rx Controller 124 can adjust the phase offset between the data and the internal clock of the receiver 120 through an appropriate bytesel control signal.

Figure 7:
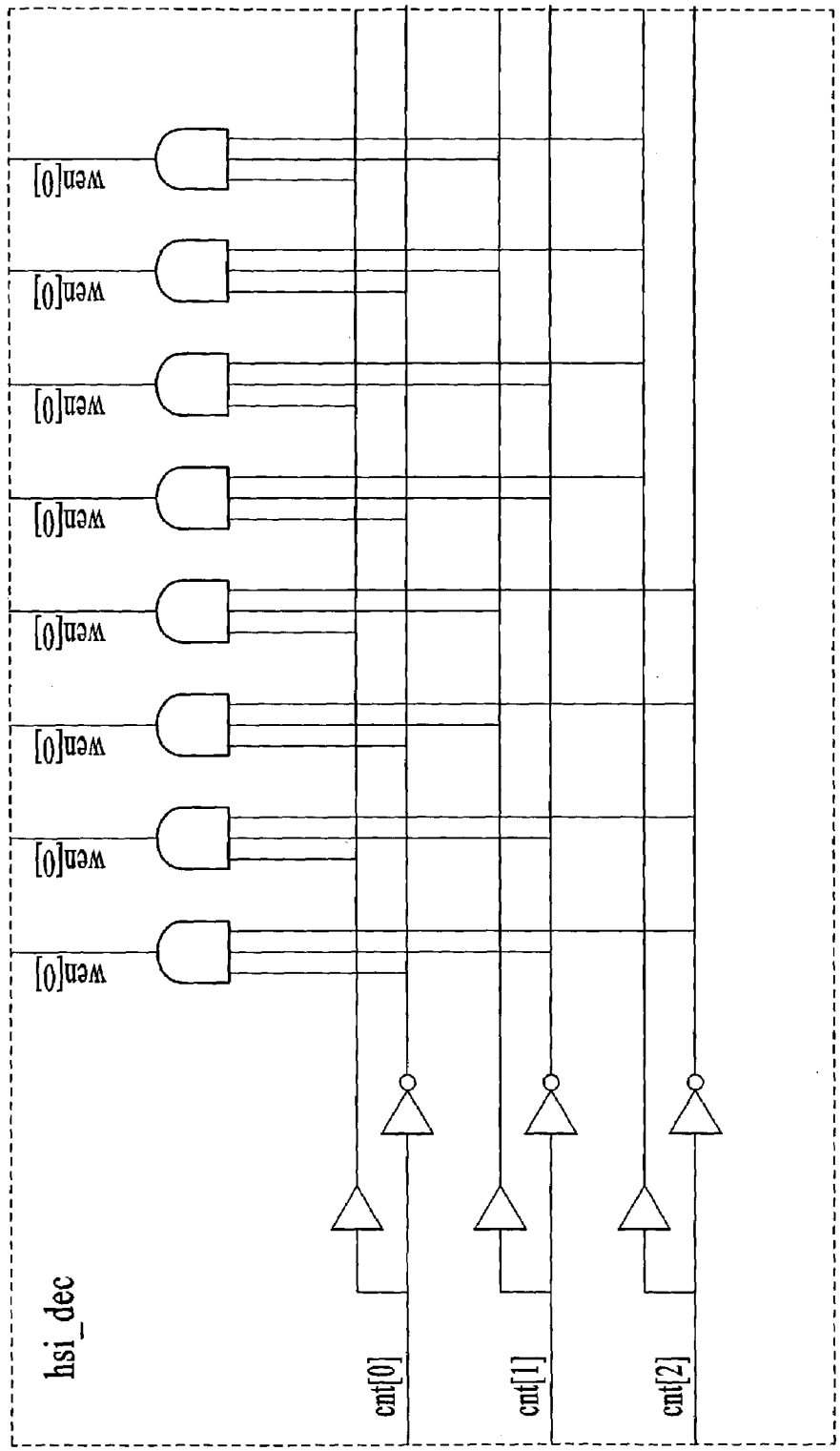
FIG. 7 is a block diagram illustrating a decoder circuit of FIG. 6, according to one embodiment of the invention.

FIG. 7 is a block diagram illustrating one embodiment of the hsi_dec decoder 520a. The hsi_dec 520b is similar to the decoder 520b. The hsi_dec decoder 520a implements logic functions described below in Table 1.

TABLE 1

| |
| --- |
| Wen[0] = !Cnt[2] · !Cnt[1] · !Cnt[0] |
| Wen[1] = !Cnt[2] · !Cnt[1] · Cnt[0] |
| Wen[2] = !Cnt[2] · Cnt[1] · !Cnt[0] |
| Wen[3] = !Cnt[2] · Cnt[1] · Cnt[0] |
| Wen[4] = Cnt[2] · !Cnt[1] · !Cnt[0] |
| Wen[5] = Cnt[2] · !Cnt[1] · Cnt[0] |
| Wen[6] = Cnt[2] · Cnt[1] · !Cnt[0] |
| Wen[7] = Cnt[2] · Cnt[1] · Cnt[0] |

(Note: ! denotes complement.)

Figure 8:
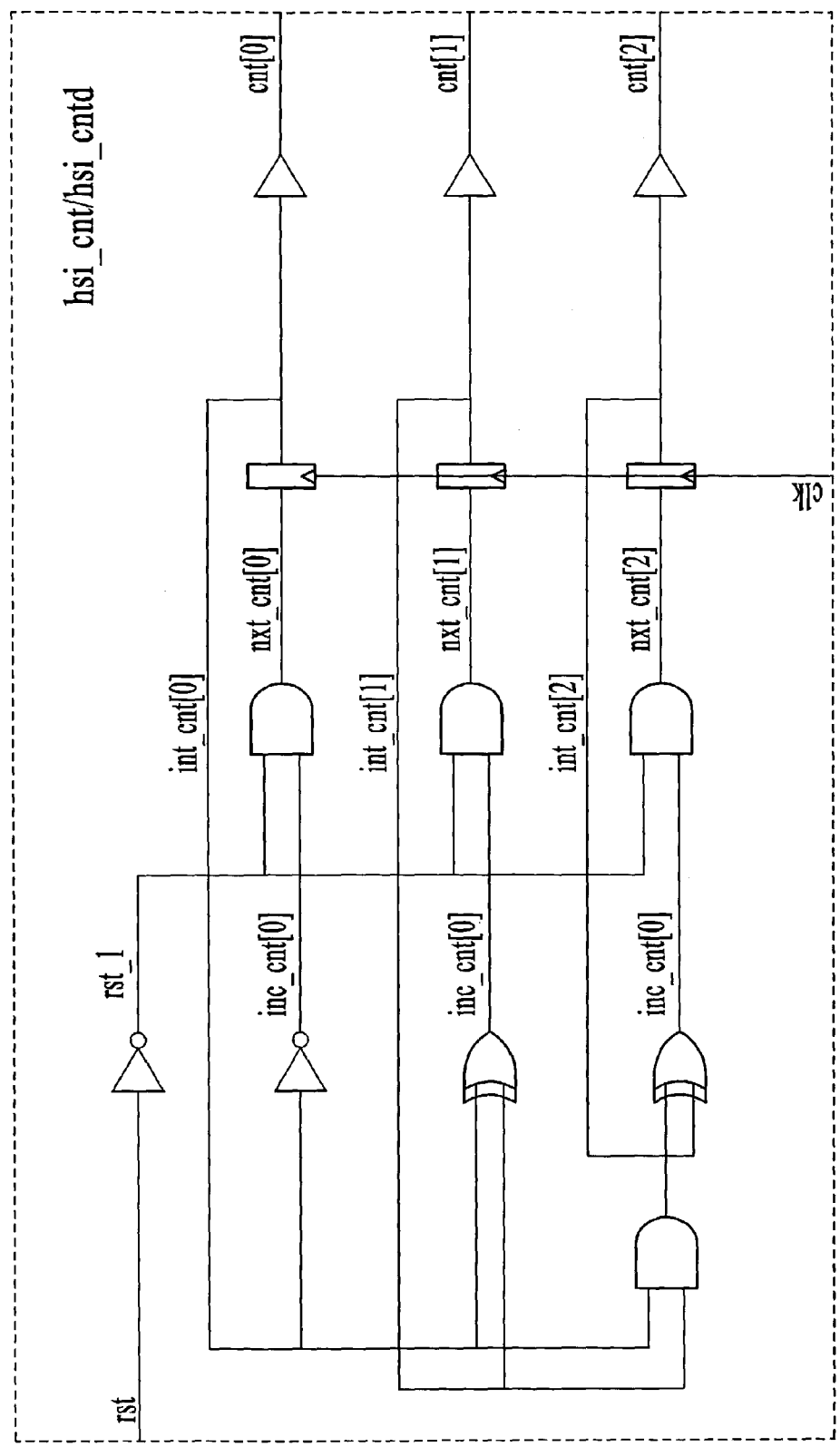
FIG. 8 is a block diagram illustrating a counter circuit of FIG. 6, according to one embodiment of the invention.

FIG. 8 is a block diagram illustrating one embodiment of the hsi_cnt counter 530a in accordance with one embodiment of the invention. Upon receiving a reset signal rx_reset_d3, the hsi_cnt counter 530a generates a cnt[2:0] output that increments consecutively and repetitively from 0 to 7. The hsi_cnt counter 530a is synchronous with a clock signal clk, which is an internal clock of the receiver 120. That is, the value of cnt[2:0] changes at every clk clock cycle. In one embodiment, clk has a frequency of approximately 167 Mhz.

Referring again to FIGS. 5 and 6, the outputs of the hsi_cnt 530a are provided to the FIFO buffers 510a–510d and 512a–512d as the signal ra[0:1]. In one embodiment, the least significant two bits of cnt[2:0] are used as the signal ra[0:1]. As a result, the 4-input muxes 620a–620b select a different pair of data latches every clk clock cycle.

With reference still to FIGS. 5 and 6, the hsi_cnt counter 530b is synchronous to rx_clk_90. In one embodiment, rx_clk_90 has a frequency of approximately twice that of an internal clock of the receiver 120. In particular, rx_clk_90 has a frequency of approximately 333 Mhz. The outputs of the hsi_cnt 530b are provided to the hsi_dec decoders 520a–520b for generating the wen[7:0] signals that in turn selects the appropriate data latches. Thus, a different pair of data latches 610a–610h are selected every cycle of the clock rx_clk_90. Note that data latches of FIFO buffers 512a–512d latch in data synchronously with the rx_clk_270 clock. Accordingly, the cnt[2:0] values generated by the hsi_cnt counter 530b pass through a data latch 540 that is synchronous with the rx_clk_270 clock before entering the hsi_dec decoder 520b.

Figure 9:
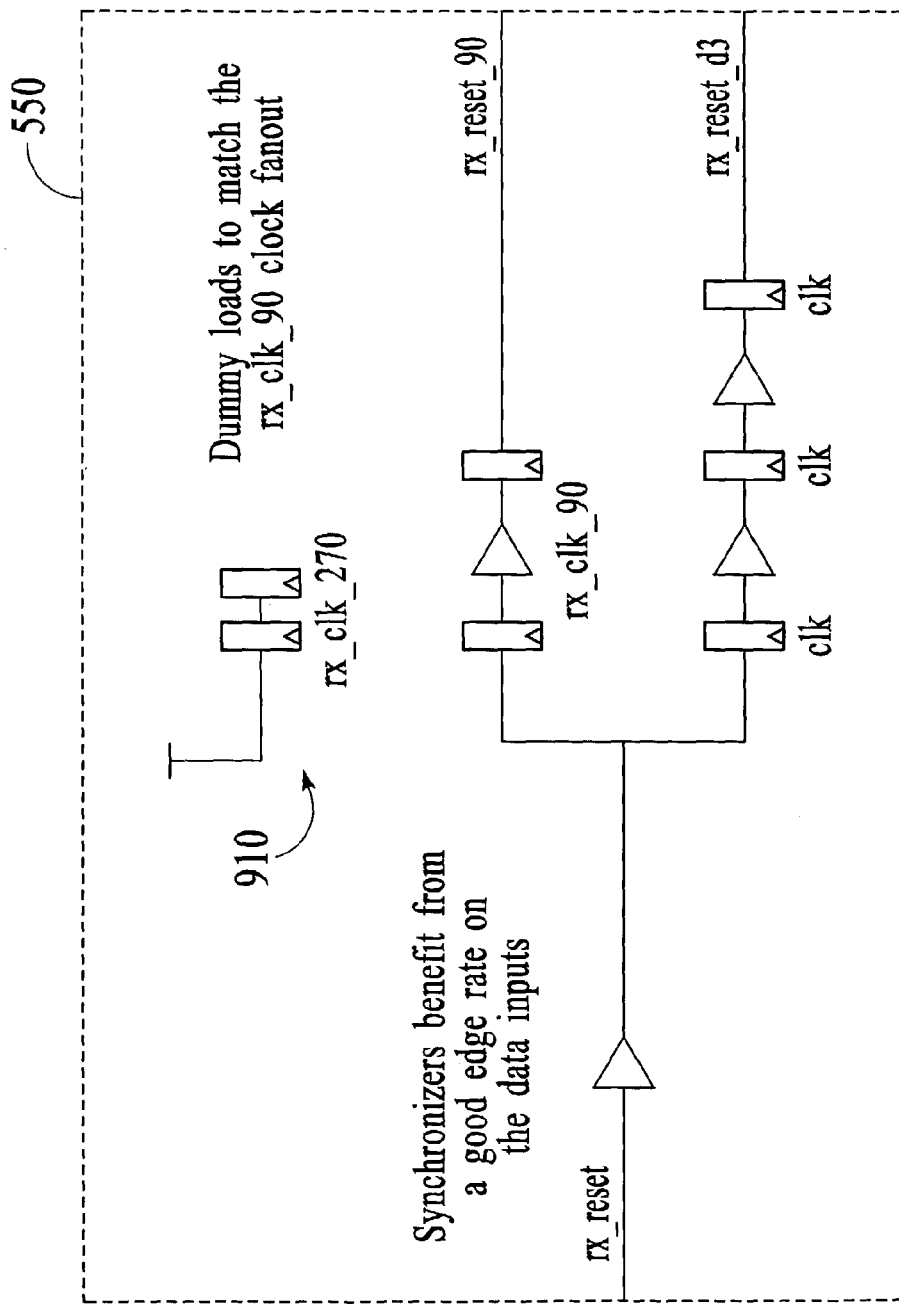
FIG. 9 is a block diagram illustrating a reset circuit of FIG. 6 according to one embodiment of the invention.

FIG. 9 is a block diagram illustrating an implementation of hsi_rst reset block 550 in accordance with one embodiment of the invention. As shown, the hsi_rst reset block 550 generates a rx_reset_90 signal and a rx_reset_d3 signal in response to a rx_reset signal generated by the HSI Rx Controller 124. The rx_reset_90 signal is synchronous with the rx_clk_90 signal, and the rx_reset_d3 signal is synchronous with clk, an internal clock of the receiver 120. Note that the hsi_rst reset block 550 further includes dummy loads 910 for matching the load of rx_clk_90.

Attention now turns to another embodiment of the invention referred herein as "bit-lane reordering". According to the embodiments where "bit-lane reordering" is allowed, output pins of the transmitter interface can be connected to any input pins of the receiver interface. In other words, the receiver can reconstruct transmitted data regardless of a routing correspondence of the parallel interconnect bus 130. In embodiments where "bit-lane reordering" is not allowed, output pins of the transmitter interface must be connected to corresponding pins of the receiver interface.

Figure 10:
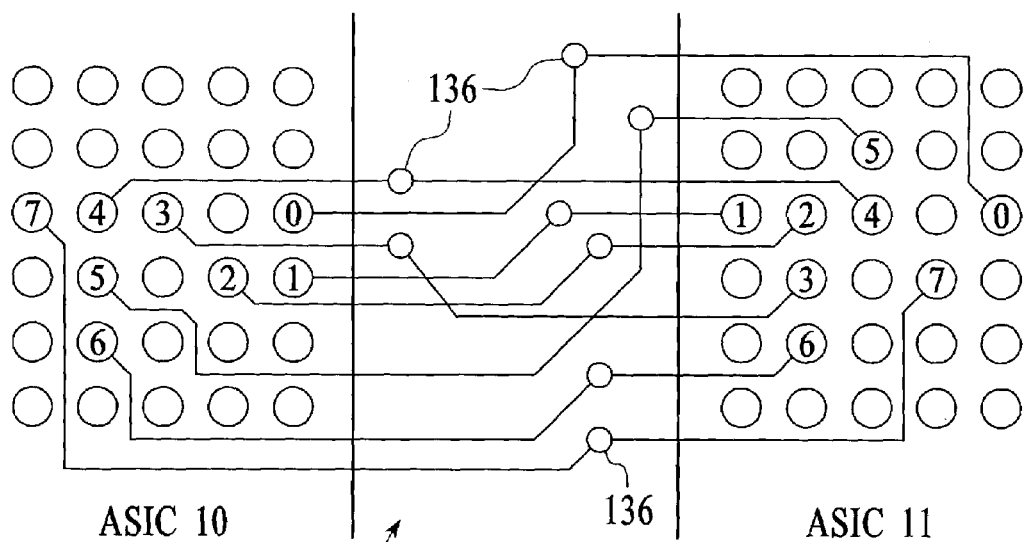
FIG. 10 illustrates signal traces connecting two ASICs according to an embodiment in which "bit-lane reordering" is not allowed.

FIG. 10 illustrates signal traces 135 connecting two ASICs 10 and 11 (Application Specific Integrated Circuits) according to an embodiment of the invention in which "bit-lane reordering" is not allowed. As shown, output pins of the ASIC 10 must be connected to corresponding input pins of the ASIC 11. In order to connect specific pins of the ASICs 10 and 12, two metal layers in the circuit board may be needed, and vias 136 for routing the signal traces 135 are also needed. The routing of the signal traces 135 takes up a significant amount of board space and routing resources. Routing of signal traces 135 through vias 136 and multiple metal layers also contributes to signal degradation because vias generally represent impedance discontinuities as routing layers can differ in electrical characteristics.

Figure 11:
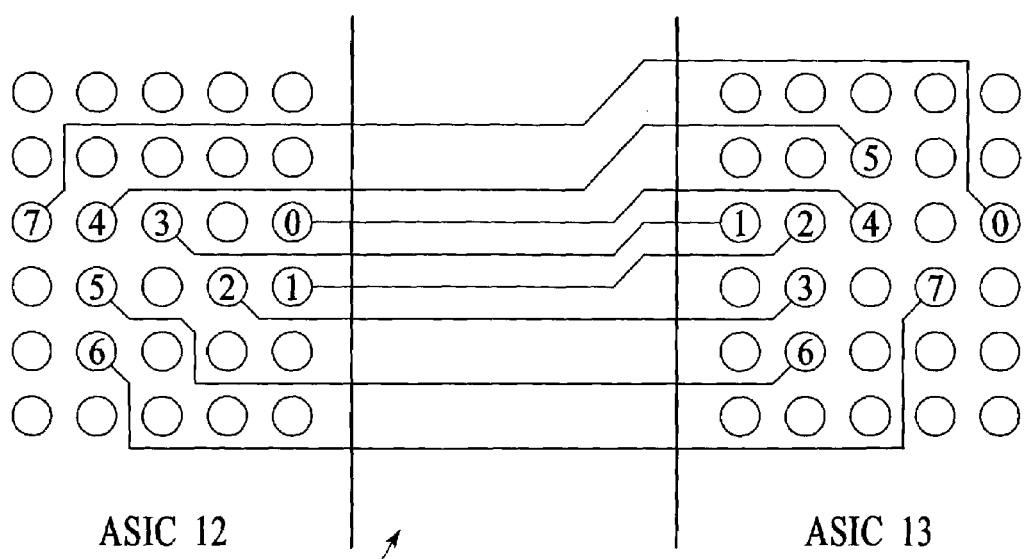
FIG. 11 illustrates signal traces connecting two ASICs according to an embodiment in which "bit-lane reordering" is allowed.

FIG. 11 illustrates signal traces 135 connecting two ASICs 12 and 13 according to an embodiment of the invention in which "bit-lane reordering" is allowed. As shown, output pins of the transmitter interface of the ASIC 12 does not have to be connected to corresponding input pins of the receiver interface of the ASIC 13. The appropriate mapping of the bit-lanes is performed by HSI Rx Controller 124. In comparison to the embodiment of FIG. 10, less board space and routing resources are needed. Signal strength is less prone to degradation because a single routing layer can be used without requiring vias.

Figure 12:
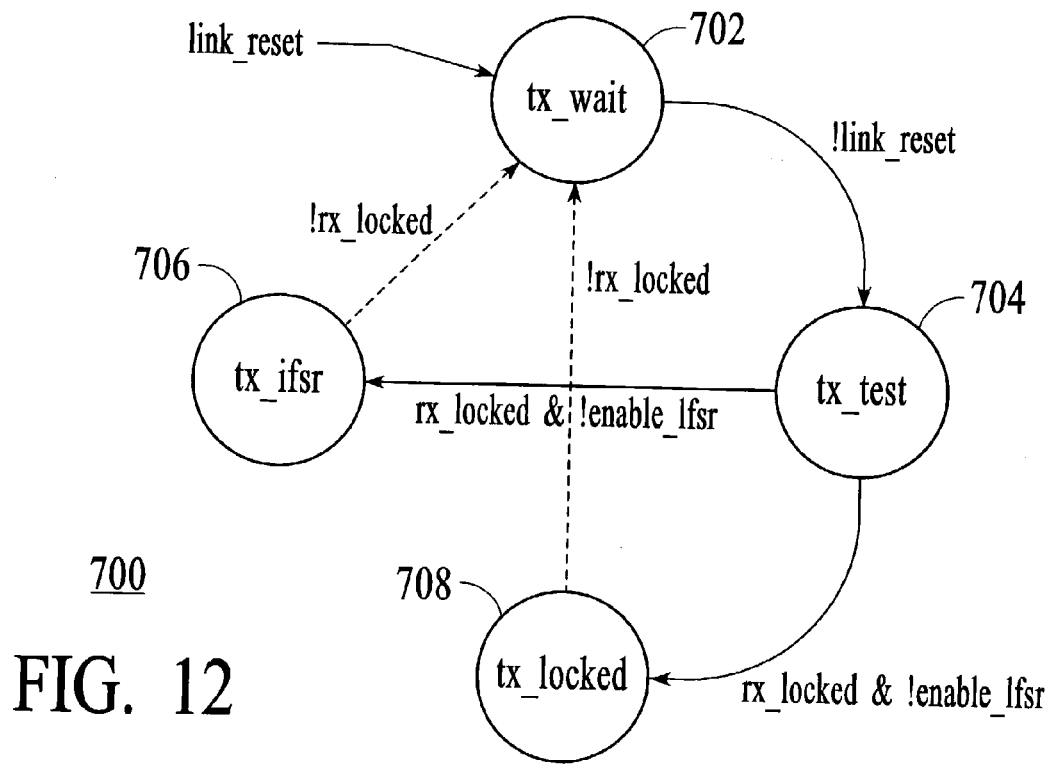
FIG. 12 is a state transition diagram for the HSI Tx Controller of FIG. 1, in accordance with one embodiment of the invention.

Attention now turns to implementation of the HSI Tx Controller 112 and the HSI Rx Controller 124. FIG. 12 is a state transition diagram 700 for the HSI Tx Controller 112 in accordance with one embodiment of the invention. As shown, the state machine of the HSI Tx Controller 112 has four states: tx_wait state 702, tx_test state 704, tx_lfsr state 706, and tx_locked state 708. Upon receiving a link_reset signal the HSI Tx Controller 112 enters the tx_wait state 702. When the link_reset signal is de-asserted, the HSI Tx Controller 112 enters the tx_test state 706. In one embodiment, the link_reset signal is generated by the HSI Rx Controller 124 and is transmitted to the HSI Tx Controller 112 via signal lines 102 (FIG. 1).

When the HSI Tx Controller 112 is in the tx_test state 706, it performs the following functions:

The HSI Tx Controller 112 generates a predetermined CRC (Cyclic Redundancy Check) test pattern. In one embodiment, the CRC test pattern is 204 symbols long, and is used by the HSI Rx Controller 124 for detecting the routing correspondence and the phase relationship between the transmit clock and the internal clock(s) of the receiver 120. Part of a sample CRC pattern 820 generated by the HSI Tx Controller 112 is shown in FIG. 14.

The HSI Tx Controller 112 drives the link with the CRC test pattern continuously. According to the present embodiment, the receiver 120 will transmit a rx_locked signal back to the HSI Tx Controller 112 via signal lines 102 (FIG. 1), if the receiver 120 does not detect any errors after receiving the CRC test pattern.

When the HSI Tx Controller 112 receives the rx_locked signal from the receiver 120, it will enter either the tx_lfsr state 706 or tx_locked state 708, depending on whether a local configuration bit is set.

In the tx_lfsr state 706, the HSI Tx Controller 112 performs the following functions:

The HSI Tx Controller 112 signals its acceptance of the receiver 120's lock indication by terminating the CRC test pattern with four continuous symbols of all 1's.

The HSI Tx Controller 112 drives the link with a data pattern derived from a predetermined 32-bit LFSR (Linear-Feedback Shift Register). In one embodiment, the LFSR pattern is chosen to provide worst case symbol transitions as a manufacturing and diagnostic aid.

If the receiver 120 de-asserts the rx_locked signal, the HSI Tx Controller 112 returns to the tx_wait state 702.

In the tx_locked state 708, the HSI Tx Controller 112 performs the following functions:

The HSI Tx Controller 112 signals its acceptance of the receiver 120's lock indication by terminating the CRC test pattern with four continuous symbols of all 0's.

When in the tx_locked state 708, the HSI Tx Controller 112 will pass any data presented to it by user logic circuits of the transmitter 110 to the HSI Tx Interface Circuit 114 for transmission to the receiver 120.

If the receiver 120 de-asserts the rx_locked signal, the HSI Tx Controller 112 returns to the tx_wait state 702.

According to one embodiment of the invention, during any one of the states, the HSI Tx Controller 112 may reset the link. In this embodiment, the HSI Tx Controller 112 has a circuit for disabling the bus clock upon receiving appropriate control signals. The receiver 120, upon failing to receive the bus clock signal, will restart the reset sequence by sending a link_reset signal to the HSI Tx Controller 112 and/or de-asserting the rx_locked signal.

Figure 13:
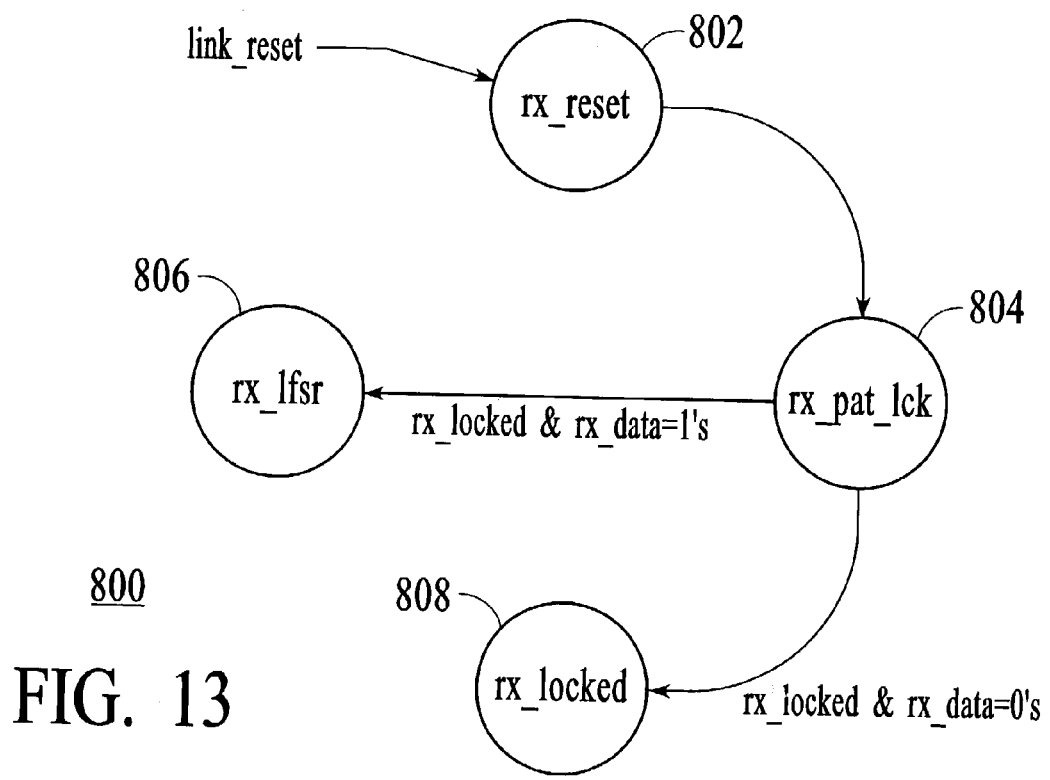
FIG. 13 is a state transition diagram for the HSI Rx Controller of FIG. 1, in accordance with one embodiment of the invention.

FIG. 13 is a state transition diagram 800 for the HSI Rx Controller 124 in accordance with one embodiment of the invention. As shown, the state transition diagram 800 has four states: rx_reset state 802, rx_pat_lck state 804, rx_lfsr state 806, and rx_locked state 808. Upon receiving a link_reset signal from user logic of the receiver 120, the HSI Rx Controller 124 enters the rx_reset state 802. When the link_reset signal is de-asserted, the HSI Rx Controller 124 enters the rx_pat_lck state 806.

When the HSI Rx Controller 124 is in the rx_pat_lck state 804, the HSI Tx Controller 112 will be in a tx_test state 704. In the rx_pat_lck state 804, the HSI Tx Controller 112 performs the following functions:

The HSI Rx Controller 124 scans each of the individual "bit-lanes" looking for unique bit-lane specific signatures. In one embodiment, the CRC test pattern is 204 symbols long, and part of a sample of which is shown in FIG. 14. Also shown in FIG. 14 are some of the unique data stream "signatures" 822a–822b that the HSI Rx Controller 124 looks for when determining the bit-lane correspondences. For instance, the signature 822a indicates the bit-lane is associated with a bit0 output of transmitter 110, and the signature 822b indicates that the bit-lane is associated with a bit8 output of the transmitter 110.

After the bit-lanes have been learned, the HSI Rx Controller 124 compares the received data with a locally generated CRC test pattern. When no errors have been found after one or more iterations, the HSI Rx Controller 124 transmits an asserted rx_locked signal to the transmitter 110. The HSI Rx Controller 124 then waits for a response from the HSI Tx Controller 112.

If the HSI Tx Controller 112 responds to the rx_locked signal by terminating the CRC pattern with a predetermined consecutive sequence of 1's, then the HSI Rx Controller 124 enters the rx_locked state 806.

If the HSI Tx Controller 112 responds to the rx_locked signal by terminating the CRC pattern with a predetermined consecutive sequence 0's, then the HSI Rx Controller 124 enters the rx_locked state 808.

In the rx_lfsr state 806, the HSI Rx Controller 124 performs the following functions:

The HSI Rx Controller 124 resets a local LFSR (Linear Feedback Shift Register) and starts generating an LFSR pattern.

The HSI Rx Controller 124 compares the locally generated LFSR pattern against the incoming data. If the incoming data and the locally generated pattern differ, then a link transmission error has occurred. In on embodiment of the invention, HSI Rx Controller 124 counts the errors and provides a bit-mask for debugging.

In one embodiment, the HSI Rx Controller 124 calculates a transmission error rate based on the number of errors occurred and the number of bits transferred. If the transmission error rate is higher than a predetermined threshold, the HSI Rx Controller 124 generates an error message for the user logic of the receiver 120.

In the rx_locked state 808, the HSI Tx Controller simply passes any incoming data to the user logic of the receiver 120.

According to the invention, the link 100 can be used to transport cell-based data as well as free flowing data streams described above. In an embodiment where cell-based data is transported, an interface is provided for the HSI Tx Controller 112 and the HSI Rx Controller 124 for supporting cells of 68 (or 72) symbols in a cell-based transport mode. If the cell-based transport mode is desired, then the interface provides the HSI Tx Controller 112 a cell framing pulse once every seventeen transmitter clock cycles. In this embodiment, since the symbol rate is four times the frequency of the transmitter clock cycle, one cell framing pulse will be sent every 68 (or 72) symbols.

Furthermore, the CRC pattern is 204 symbols long, which is equivalent to three 68 symbol frames aligned to the framing pulse. During the rx_pat_lck state, the starting point and ending point of a cell are recovered at the receiver 120 and are used to initialize a seventeen cycle counter which will continue to indicate which data word is aligned with the framing pulse after transition to the rx_locked state. This framing information is provided to user logic 105 so it can correctly know the cell positions within the data streams.

Although specific embodiments of the invention have been described and illustrated, the invention is not to be limited to the specific forms or arrangements of parts as described and illustrated herein. The invention is limited only by the claims.

What is claimed is:

1. A system comprising:
  an interconnect bus having a plurality of signal traces;
  a first integrated circuit having:
    a transmitter controller, and
    a transmitter interface circuit coupled to the transmitter controller to receive first data synchronously with a system clock signal, to generate a bus clock signal, to convert the first data into second data synchronous with transitions of the bus clock signal and to output the second data to the interconnect bus; and
  a second integrated circuit having:
    a receiver controller configured to generate at least one control signal indicative of a bit-lane correspondence between the first integrated circuit and the second integrated circuit, and
    a receiver interface circuit coupled to the interconnect bus to retrieve the second data and coupled to the receiver controller to receive the at least one control signal, wherein the receiver interface circuit restores the first data according to the at least one control signal.

2. The system of claim 1, wherein the transmitter controller generates predetermined test data and provides a pseudo-random sequence to the transmitter interface circuit for transmission to the second integrated circuit.

3. The system of claim 2, wherein the receiver controller generates like predetermined test data, compares the like predetermined test data to data received by the receiver interface circuit, and determines a transmission error rate of the interconnect bus.

4. The system of claim 1, wherein the receiver controller comprises a circuit to deduce a bit-lane correspondence between the outputs of the transmitter interface circuit and inputs of the receiver interface circuit.

5. The system of claim 4, wherein the receiver controller comprises a circuit to deduce a phase offset between a rising transition of the bus clock signal and a rising transition of the system clock signal.

6. The system of claim 5, wherein the receiver controller generates the control signal according to the bit-lane correspondence and the phase offset.

7. The system of claim 1, wherein the receiver controller compares at least one portion of the second data to a plurality of predetermined patterns each corresponding to one of a plurality of bit-lane correspondences.

8. The system of claim 1, wherein the receiver controller compares at least one portion of the second data to at least two predetermined patterns corresponding to at least two phase offsets between a rising transition of the bus clock signal and a rising transition of the system clock signal.

9. A system comprising:
  an interconnect bus having a plurality of signal traces;
  a first integrated circuit having:
    a transmitter controller,
    a transmitter interface circuit coupled to the transmitter controller to receive first data synchronously with a system clock signal, to generate a bus clock signal, to convert the first data into second data synchronous with transitions of the bus clock signal and to output the second data to the interconnect bus; and
  a second integrated circuit having:
    a receiver controller configured to generate control signals indicative of a phase offset between a rising transition of the bus clock signal and a rising transition of the system clock signal from the second data, and
    a receiver interface circuit coupled to the interconnect bus to retrieve the second data and configured to restore the first data according to the control signals.

10. The system of claim 9, wherein the transmitter controller generates predetermined test data and provides a pseudo-random sequence to the transmitter interface circuit for transmission to the second integrated circuit.

11. The system of claim 10, wherein the receiver controller generates like predetermined test data, compares the like predetermined test data to data received by the receiver interface circuit, and determines a transmission error rate of the interconnect bus.

12. The system of claim 9, wherein the receiver controller comprises a circuit to deduce a bit-lane correspondence between the outputs of the transmitter interface circuit and the inputs of the receiver interface circuit.

13. The system of claim 12, wherein the receiver controller generates the control signals consistent with the bit-lane correspondence and the phase offset.

14. The system of claim 9, wherein the receiver controller compares at least one portion of the second data to a plurality of predetermined patterns each corresponding to one of a plurality of bit-lane correspondences.

15. The system of claim 9, wherein the receiver controller compares at least one portion of the second data to at least two predetermined patterns corresponding to at least two phase offsets between a rising transition of the bus clock signal and a rising transition of the system clock signal.

16. A method for communicating data from a first integrated circuit to a second integrated circuit across an interconnect bus within a system, the method comprising:
  upon receiving a reset signal, the first integrated circuit and the second integrated circuit performing a set up process that comprises deducing a bit-lane correspondence of the interconnect bus;
  transmitting data from the first integrated circuit to the second integrated across the interconnect bus; and
  reconstructing the data at the second integrated circuit according to the deduced bit-lane correspondence.

17. The method of claim 16, wherein the deducing step comprises:
  generating predetermined test data at the first integrated circuit;
  transmitting the predetermined test data to the second integrated circuit; and
  at the second integrated circuit, comparing at least a portion of received data to a plurality of predetermined patterns each corresponding to one of a plurality of bit-lane correspondences of the interconnect bus.

18. The method of claim 16, wherein the setup process comprises deducing a phase offset between a rising transition of a clock signal of the interconnect bus and a rising transition of a system clock of the first integrated circuit.

19. The method of claim 16, wherein the set up process comprises:
generating predetermined test data at the first integrated circuit;
transmitting the predetermined test data to the second integrated circuit;
at the second integrated circuit, comparing at least a portion of received data to at least two predetermined patterns each corresponding to one of at least two phase offsets between a rising transition of the clock signal of the interconnect bus and a rising transition of a system clock of the first integrated circuit.

20. The method of claim 16, wherein the set up process comprises:
generating predetermined test data at the first integrated circuit;
transmitting the predetermined test data to the second integrated circuit;
at the second integrated circuit, generating like predetermined test data and comparing data received by the second integrated circuit to the like predetermined test data to determine a transmission error rate of the interconnect bus.

21. A method for communicating data from a first integrated circuit to a second integrated circuit across an interconnect bus within a system, the method comprising:
upon receiving a reset signal, the first integrated circuit and the second integrated circuit performing a set up process that comprises deducing a phase offset between a rising transition of a clock signal of the interconnect bus and a rising transition of a system clock of the first integrated circuit;
transmitting data from the first integrated circuit to the second integrated across the interconnect bus; and
reconstructing the data at the second integrated circuit according to the deduced phase offset.

22. The method of claim 21, wherein the deducing step comprises:
generating predetermined test data at the first integrated circuit;
transmitting the predetermined test data to the second integrated circuit;
at the second integrated circuit, comparing at least a portion of received data to at least two predetermined patterns each corresponding to one of at least two phase offsets between a rising transition of the clock signal of the interconnect bus and a rising transition of a system clock of the first integrated circuit.

23. The method of claim 21, wherein the set up process comprises:
generating predetermined test data at the first integrated circuit;
transmitting the predetermined test data to the second integrated circuit;
at the second integrated circuit, generating like predetermined test data and comparing data received by the second integrated circuit to the like predetermined test data to determine a transmission error rate of the interconnect bus.

24. An integrated circuit, comprising:
means for coupling to another integrated circuit via an interconnect bus;
means for deducing a bit-lane correspondence of the interconnect bus;
means for receiving data from the other integrated circuit via the interconnect bus; and
means for reconstructing data transmitted by the other integrated circuit according to the deduced bit-lane correspondence.

25. The integrated circuit of claim 24, wherein the means for deducing comprises:
means for comparing at least a portion of the received data to a plurality of predetermined patterns each corresponding to one of a plurality of bit-lane correspondences of the interconnect bus.

26. The integrated circuit of claim 24, comprising
second means for deducing a phase offset between a rising transition of a clock signal of the interconnect bus and a rising transition of a system clock of the first integrated circuit.

27. The integrated circuit of claim 26, wherein the second means for deducing comprises:
means for comparing at least a portion of the received data to at least two predetermined patterns each corresponding to one of at least two phase offsets between a rising transition of the clock signal of the interconnect bus and a rising transition of a system clock of the first integrated circuit.

28. The integrated circuit of claim 24, comprising:
means for generating predetermined test data; and
means for comparing the received data to the predetermined test data to determine a transmission error rate of the interconnect bus.

* * * * *